(12) United States Patent
Kozina et al.

(10) Patent No.: US 7,930,961 B2
(45) Date of Patent: Apr. 26, 2011

(54) CROWN MOLDING CUTTING APPARATUS AND METHOD

(75) Inventors: Damian A. Kozina, Chicago, IL (US); Edward D. Adkins, Machesney Park, IL (US)

(73) Assignee: Nomis LLC, Hampshire, IL (US)

( * ) Notice: Subject to any disclaimer, the term of this patent is extended or adjusted under 35 U.S.C. 154(b) by 253 days.

(21) Appl. No.: 12/116,301

(22) Filed: May 7, 2008

(65) Prior Publication Data

US 2008/0276779 A1 Nov. 13, 2008

Related U.S. Application Data (60) Provisional application No. 60/916,529, filed on May 7, 2007.

(51) Int. Cl.
*B23D 45/04* (2006.01)

(52) U.S. Cl. .............................. 83/468.3; 83/581; 33/569

(58) Field of Classification Search ................... 83/581, 83/468.3, 435.12–435.14; 33/538, 569
See application file for complete search history.

(56) References Cited

U.S. PATENT DOCUMENTS

| | | | | |
|---|---|---|---|---|
| 1,831,124 A | * | 11/1931 | Koster ....................... 83/435.12 |
| 2,891,452 A | * | 6/1959 | Ostler et al. ................. 409/168 |
| 3,166,853 A | * | 1/1965 | Marcus ........................... 33/537 |
| 4,346,636 A | * | 8/1982 | Taylor ............................. 83/767 |
| 4,494,429 A | * | 1/1985 | Frame ........................ 83/435.13 |
| 4,608,899 A | * | 9/1986 | Twigger et al. ................. 83/745 |
| 4,884,604 A | * | 12/1989 | Rice et al. ........................ 144/84 |
| 5,016,508 A | * | 5/1991 | Hallenbeck ................ 83/435.13 |
| 5,771,767 A | * | 6/1998 | Itami ......................... 83/435.13 |
| 6,775,917 B1 | * | 8/2004 | Campbell ........................ 33/640 |
| 6,848,350 B2 | * | 2/2005 | Brazell et al. ............. 83/435.11 |
| 6,857,829 B2 | * | 2/2005 | Newton et al. ................. 408/89 |
| 7,089,978 B2 | | 8/2006 | Karkosch et al. |
| 2002/0007712 A1 | * | 1/2002 | Hayashizaki et al. .......... 83/454 |
| 2004/0154450 A1 | * | 8/2004 | Vallone ............................ 83/581 |
| 2005/0098009 A1 | | 5/2005 | Berthiaume |

* cited by examiner

*Primary Examiner* — Kenneth E. Peterson
(74) *Attorney, Agent, or Firm* — Reinhart Boerner Van Deuren P.C.

(57) ABSTRACT

A method and apparatus are provided, for positioning a work piece, such as a piece of crown molding, through use of an apparatus including a work piece support plate pivotably attached along a pivot axis to a base. The base is adapted to rest on a horizontal reference plane, such as the table of a meter saw, for pivoting motion of the support plate about the pivot axis to a desired angle with respect to the base, while the pivot axis is simultaneously positioned to extend substantially parallel to a longitudinal line of intersection between a horizontal and a vertical reference plane, established by the table and fence of the meter saw, to hold the work piece at a desired tilt angle with respect to the vertical reference plane, so that the work piece may be cut in substantially the same orientation as it will be mounted.

10 Claims, 12 Drawing Sheets

CROWN MOLDING CUTTING APPARATUS AND METHOD

CROSS-REFERENCE TO RELATED PATENT APPLICATIONS

This patent application claims the benefit of U.S. Provisional Patent Application No. 60/916,529, filed May 7, 2007, the disclosure and teachings of which are incorporated herein, in their entireties, by reference.

FIELD OF THE INVENTION

This invention relates to mitre cutting of work pieces, such as crown molding or the like, which are normally installed at an angle from a reference plane, and more particularly to facilitating the cutting of such materials with regard to the table and fence of conventional mitre-type cutting tools in substantially the final installation orientation of the crown molding or the like with respect to its reference surface.

BACKGROUND OF THE INVENTION

In order to achieve a pleasing aesthetic appearance, decorative trim pieces, often referred to as crown molding, are sometimes installed at an angle along the intersection of a horizontal and a vertical surface, such as is formed by the ceiling and the walls of a room, for example. Such angled moldings are also often attached at the top end of the vertical front and sides of cabinetry or furniture pieces. Traditionally, such angled trim pieces have been mounted in such a manner that they tilt outward from the mounting surface at predetermined angles, such as 38 degrees, 45 degrees or 52 degrees. Crown molding will typically be designed for use at a particular predetermined angle.

Where adjacent pieces of crown molding intersect one another, such as at the corners of a room, or at the corners of a piece of cabinetry or furniture, for example, the abutting pieces of molding must be precisely cut at a compound angle, in order to achieve a proper fit at the juncture of the two adjacent pieces of angled molding. Typically, such cutting is done with the use of a device such as a mitre saw, which has a horizontal table and a fence extending vertically above the table, for supporting the work piece as it is cut to the proper angle. In the past, in order to cut crown molding on a saw having a standard table and fence arrangement, it has been necessary to place the work piece on the table in a position substantially upside down and reversed from the position in which it is to be installed. The blade of the saw must then be precisely set at an angle which is also substantially opposite from the angle at which the finished piece will abut the adjoining piece of molding when installed.

As anyone who has ever attempted to cut crown molding with a typical mitre saw table and fence arrangement will attest, the entire process can be very confusing and frustrating, and often results in the waste of considerable material and time due to mistakes being made in trying to get the work piece properly oriented in the proper upside-down, backwards, oppositely oriented position on the saw table.

It is highly desirable, therefore, to provide an improved apparatus and method for cutting work pieces of crown molding and the like, using typical mitre-cutting saws in a manner which allows the work piece to be positioned with reference to the table and fence of the mitre-cutting saw in the same orientation as the crown molding will eventually be installed.

BRIEF SUMMARY OF THE INVENTION

The invention provides an improved method and apparatus for positioning a work piece, such as a piece of crown molding, through use of an apparatus including a work piece support plate pivotably attached along a pivot axis to a base which is adapted to rest on a horizontal reference plane, such as the table of a mitre saw, for pivoting motion of the support plate about the pivot axis to a desired angle with respect to the base, while the pivot axis is simultaneously positioned to extend substantially parallel to a longitudinal line of intersection between a horizontal and vertical reference plane, such as are established by the surface of the table and fence of a typical mitre saw, to thereby hold the work piece at a desired tilt angle with respect to the vertical reference plane.

In one form of the invention, an apparatus is provided for positioning a work piece, with respect to substantially horizontal and vertical reference planes intersecting one another along a longitudinal line of intersection at substantially right angles to one another, so that the work piece can be cut along a cutting plane passing through both the horizontal and vertical reference planes and defining a cutting line of intersection with the horizontal plane disposed at a desired cutting angle from the longitudinal line of intersection of the reference planes while the apparatus holds the work piece in a tilted position at a desired tilt angle with respect to the vertical plane. The apparatus includes a work piece support plate which is pivotably attached along a pivot axis to a base. The base is adapted to rest on the horizontal reference plane, to allow for pivoting motion of the support plate about the pivot axis to the desired tilt angle with respect to the vertical reference plane, while the apparatus is positioned on the horizontal plane with the pivot axis extending parallel to the longitudinal line of intersection between the horizontal and vertical reference planes.

In some forms of the invention, the apparatus also includes a releasable retaining arrangement, which is operatively connectable between the work piece support plate and the base, for holding the work piece support plate at the desired tilt angle from the vertical reference plane.

In some forms of the invention, the releasable retaining arrangement is configured for holding the work piece support plate at two or more different potential desired tilt angles. The work piece support plate, in some forms of the invention, may also be pivotable about the pivot axis from the desired tilt angle to an angular position adjacent the base, for compact stowage of the apparatus.

Where the work piece has bottom and rear reference surfaces thereof, and a front face thereof, all extending along a longitudinal axis of the work piece, the work piece support plate may have a work piece support surface thereof that is adapted for engaging at least a portion of the front face of the work piece, while the bottom and rear reference surfaces of the work piece are operatively engaging the horizontal and vertical reference planes respectively, in such a manner that the work piece is supported by the apparatus at the desired tilt angle from the vertical reference plane with the longitudinal axis of the work piece extending substantially parallel to the longitudinal line of intersection of the horizontal and vertical reference planes. Where the front face of the work piece has a protrusion, such as a dentil, for example, extending therefrom, the support surface of the support plate may be configured for receiving the protrusion in a non-supporting manner, while the front face of the work piece is engaging the support surface in a supporting manner at the at least a portion of the front face.

Where a work piece is configured for mounting at a predetermined tilt angle from a tilt angle reference plane, an apparatus may further include a gage member configured for determining the predetermined tilt angle of the work piece. In some forms of the invention, the gage member may be attachable to the base for stowage.

A releasable retaining arrangement, according to the invention, may include a brace member adapted for operative attachment between the base and the support plate. The brace member may be configured for holding the work piece support plate at two or more potential desired tilt angles. In some forms of the invention, the brace member may be pivotably attached to one of the base and support plate, and may further have a distal portion thereof adapted for fixable attachment to the other of the base and the support plate. The other of the base and support plate may further include a recess therein, for receiving and retaining the distal portion of the brace member. The other of the base and support plate may also include two or more recesses therein, each configured for receiving and retaining the distal portion of the brace member, when the brace member is pivoted with respect to the one of the base and support plate to a corresponding position for holding the work piece support plate at one or the other of the two or more different potential desired tilt angles.

In some forms of the invention, the support plate may include openings extending therethrough from the support surface to each of the recesses on the backside of the support plate, such that the distal end of the brace member is visible from the support surface of the support plate through the opening extending from one of the recesses in which the distal end of the brace member is received. In this manner, positioning of the support plate at a desired angle is facilitated.

In embodiments of the invention in which the support surface of the support plate includes a longitudinally extending groove therein, for receiving a protrusion of the work piece, such as a dentil, while the remainder of the front face is engaging the support surface, the invention may further include at least one insert adapted to be retained in the longitudinally extending groove and having an insert support surface thereof for at least partially extending the support surface of the support plate across the longitudinally extending groove. Such an insert may be used for enhancing support of the work piece for work pieces not having a protrusion, or for work pieces having a width small enough that they would not extend sufficiently beyond the longitudinally extending groove to be adequately supported by the support surface of the support plate. Embodiments of the invention including one or more inserts adapted to be retained in the longitudinally extending groove may also include a storage tray adapted for removable attachment to the support plate for storage of the inserts within the storage tray. The storage tray may be configured for attachment to the support plate in either an operating or a stowage position of the support plate, with respect to the base. The storage tray may further be configured to provide an enlarged gripping surface when attached to the support plate while the support plate is in the operating position.

The invention may also take the form of a method for constructing an apparatus, according to the invention, or a method for positioning a work piece utilizing an apparatus according to the invention.

Other aspects, objects and advantages of the invention will be apparent from the following detailed description of exemplary embodiments of the invention as shown in the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
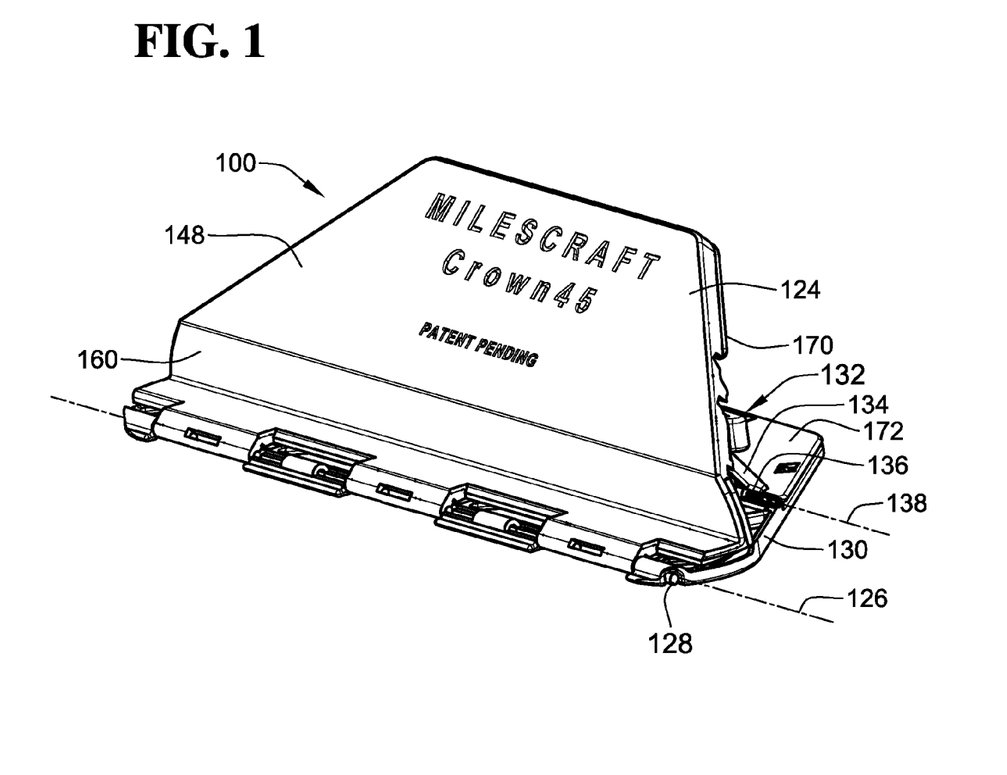
FIG. 1 is a perspective illustration of a first exemplary embodiment of a positioning apparatus, according to the invention.
Figure 2:
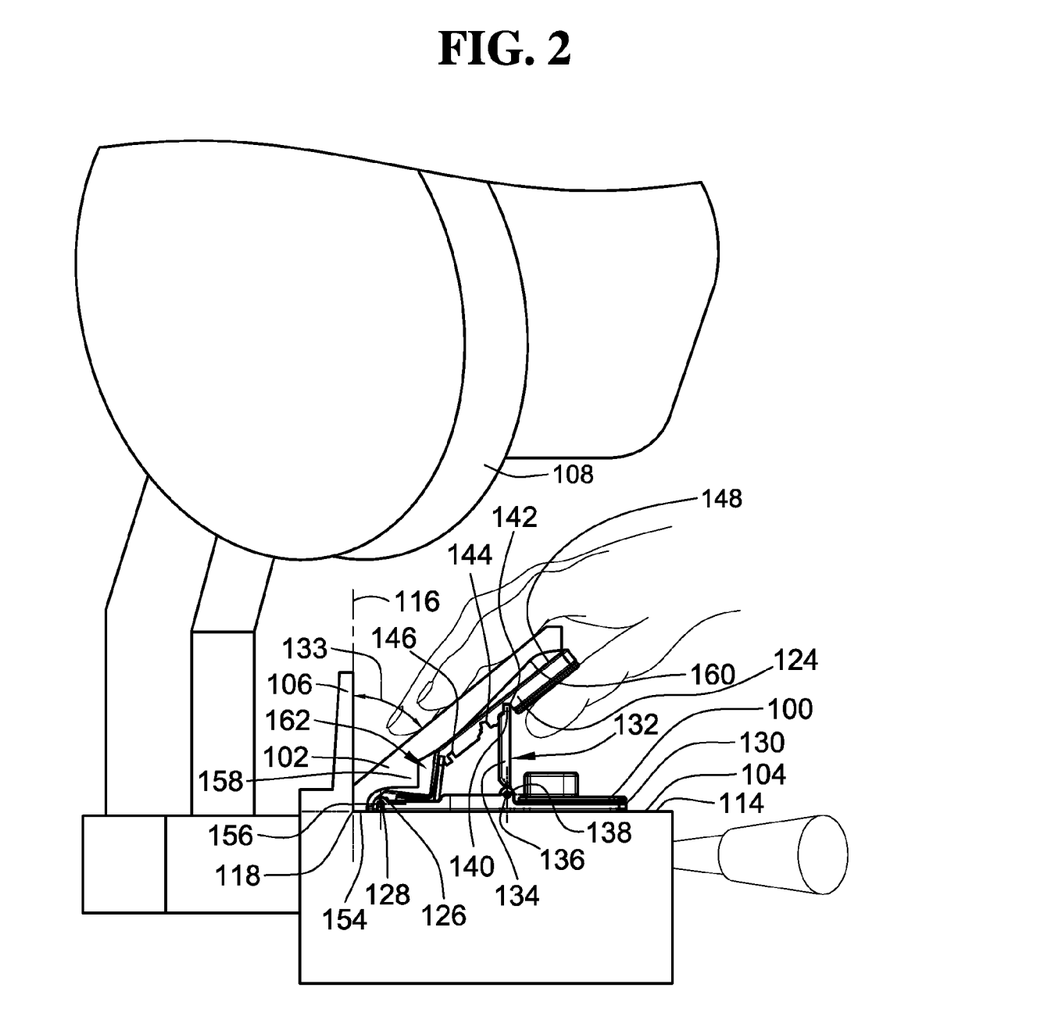
FIG. 2 is an illustration of the manner in which the first exemplary embodiment of the positioning apparatus of FIG. 1 may be utilized for holding a work piece at a desired tilt angle with respect to a vertical and a horizontal reference plane.
Figure 3:
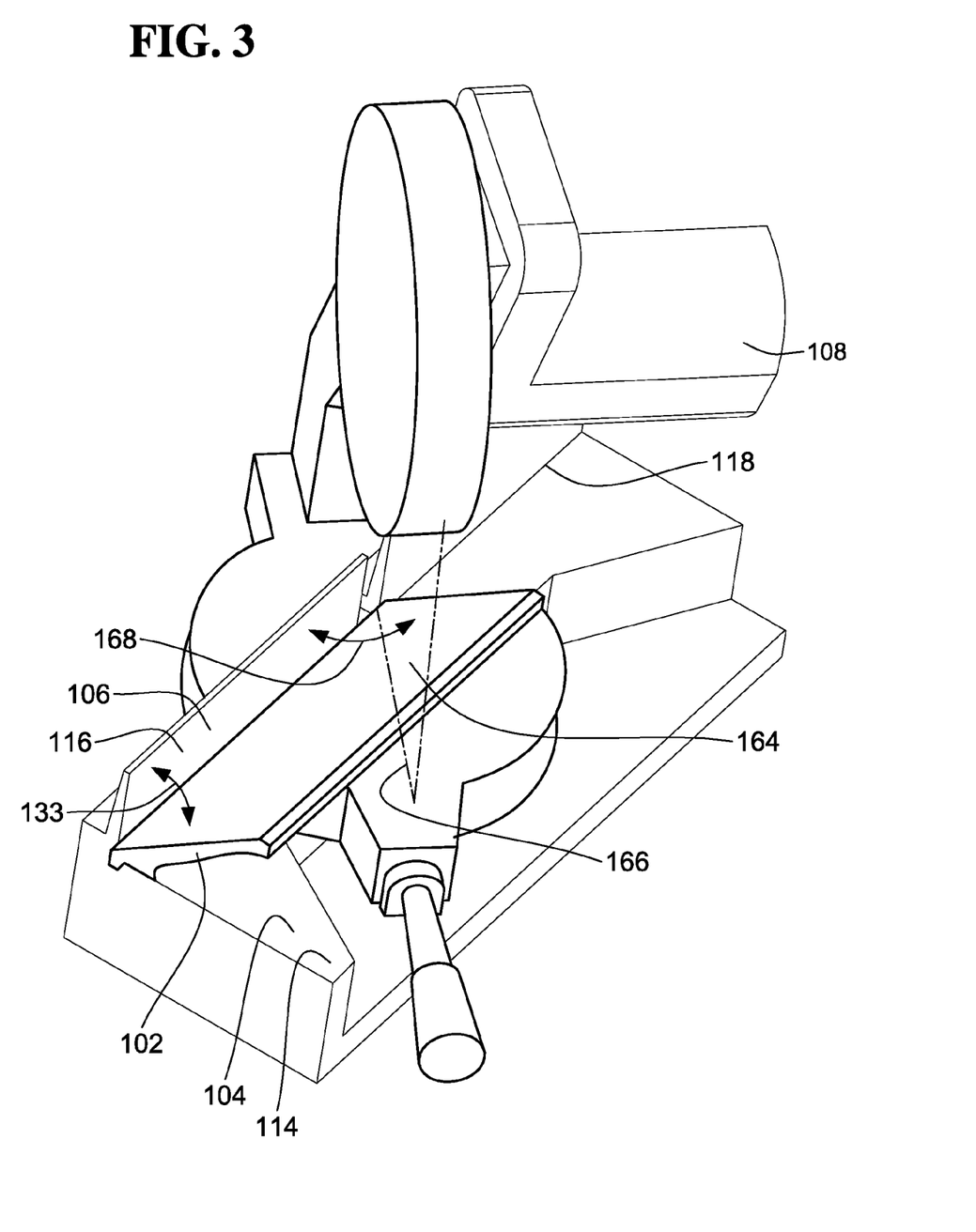
FIG. 3 is a perspective illustration of the manner in which the work piece of FIG. 2 may be cut at a desired cutting angle along a cutting plane when held at the desired tilt angle by the positioning apparatus, according to the invention.
Figure 4:
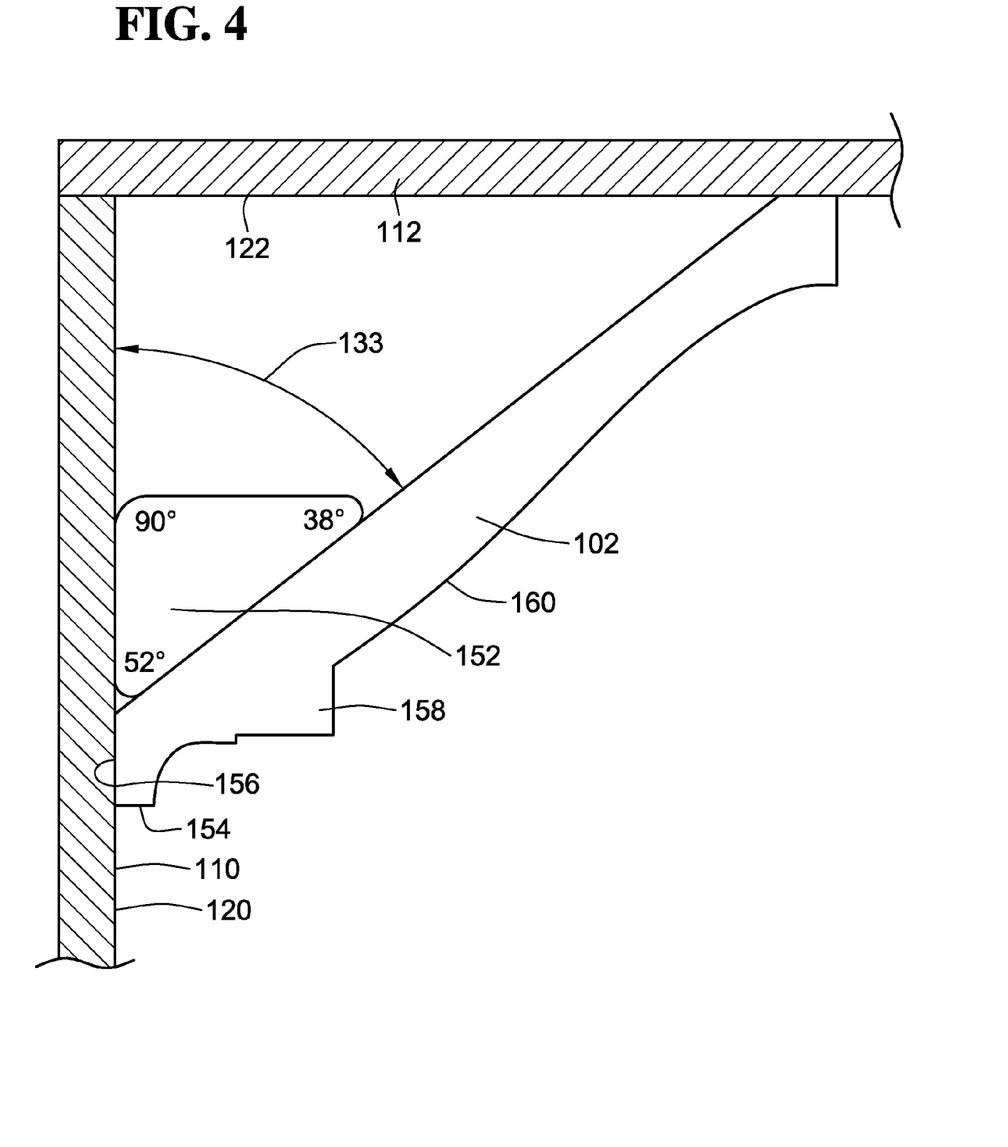
FIG. 4 is a cross-sectional schematic illustration of a work piece, in the form of a crown molding positioned for mounting at the intersection of a wall and a ceiling, and further illustrating the manner in which a gage member, of the first exemplary embodiment of the apparatus shown in FIGS. 1-3, may be utilized for determining the proper tilt angle for mounting the work piece.

FIG. 1 shows a first exemplary embodiment of an apparatus 100, according to the invention, for positioning a work piece, in the form of a length of crown molding 102, on the table 104 and against the fence 106 of a mitre saw, as shown in FIGS. 2 and 3, so that the work piece 102 can be cut while positioned on the saw 108 substantially in the same orientation as the crown molding 102 will be installed along the intersection of a wall 110 and ceiling 112, as shown in FIG. 4.

Specifically, with reference to FIGS. 2-4, the positioning apparatus 100 orients and holds the work piece 102 with respect to substantially horizontal and vertical reference planes 114, 116 defined by the working faces of the table 104 and fence 106, respectively, of the mitre saw 108. The horizontal and vertical planes 114, 116 intersect one another along a longitudinal line of intersection 118 at a right angle to one another. The vertical reference plane 116 established by the fence 106 represents the vertical mounting surface 120 of the wall 110, against which the lower end of the crown molding 102 will abut when the crown molding is installed at the intersection of the wall and the ceiling 110, 112. In similar fashion, the horizontal reference plane 114, established by the working surface of the table 104 is representative of a plane extending parallel to a horizontal mounting surface 122 of the ceiling 112, against which an upper end of the crown molding 102 will abut when the crown molding 102 is mounted at the intersection of the wall and the ceiling 110, 112.

As shown in FIGS. 1 and 2, the first exemplary embodiment of the positioning apparatus 100 includes a work piece support plate 124 that is pivotably attached along a pivot axis 126, through a hinge arrangement including a first hinge pin 128, to a base 130. The base 130 has a lower surface thereof adapted to rest on the horizontal reference plane 114, established by the table 104 of the saw 108.

Figure 5:
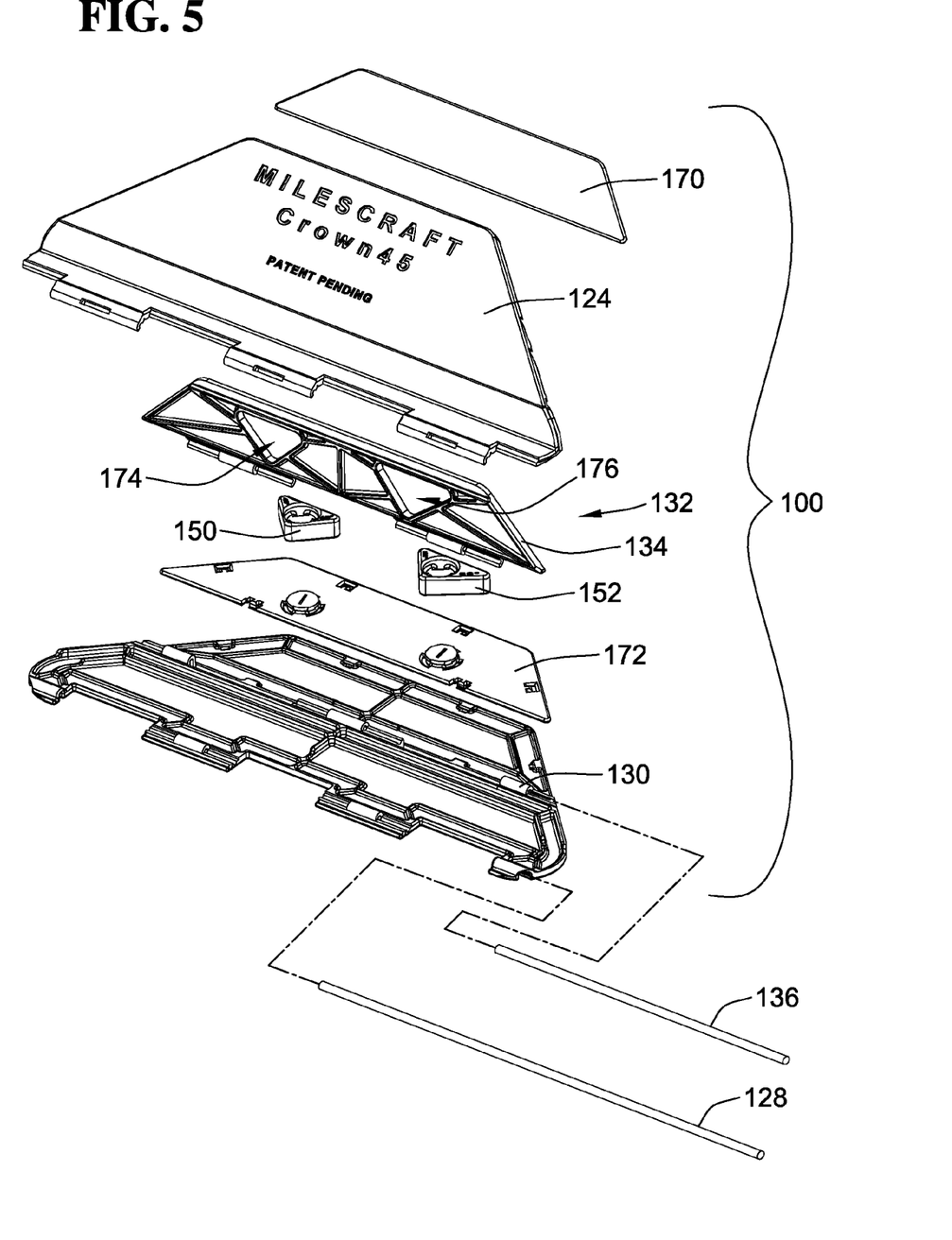
FIG. 5 is an exploded view of the positioning apparatus of FIG. 1.

The first exemplary embodiment of the positioning apparatus 100 also includes a releasable retaining arrangement, generally indicated by reference numeral 132 in FIGS. 1, 2, and 5, which is operatively connectable between the work piece support plate 124 and the base 130, for holding the work piece support 124 at a desired tilt angle 133 from the vertical reference plane 116, with the angle 133 between the work piece 102 and the vertical reference plane 116 substantially matching a desired tilt angle 133 between the wall 110 and the crown mold 102 when the crown mold is mounted in its final orientation at the intersection of the wall 110 and the ceiling 112 in the manner illustrated in FIG. 4.

Figure 6:
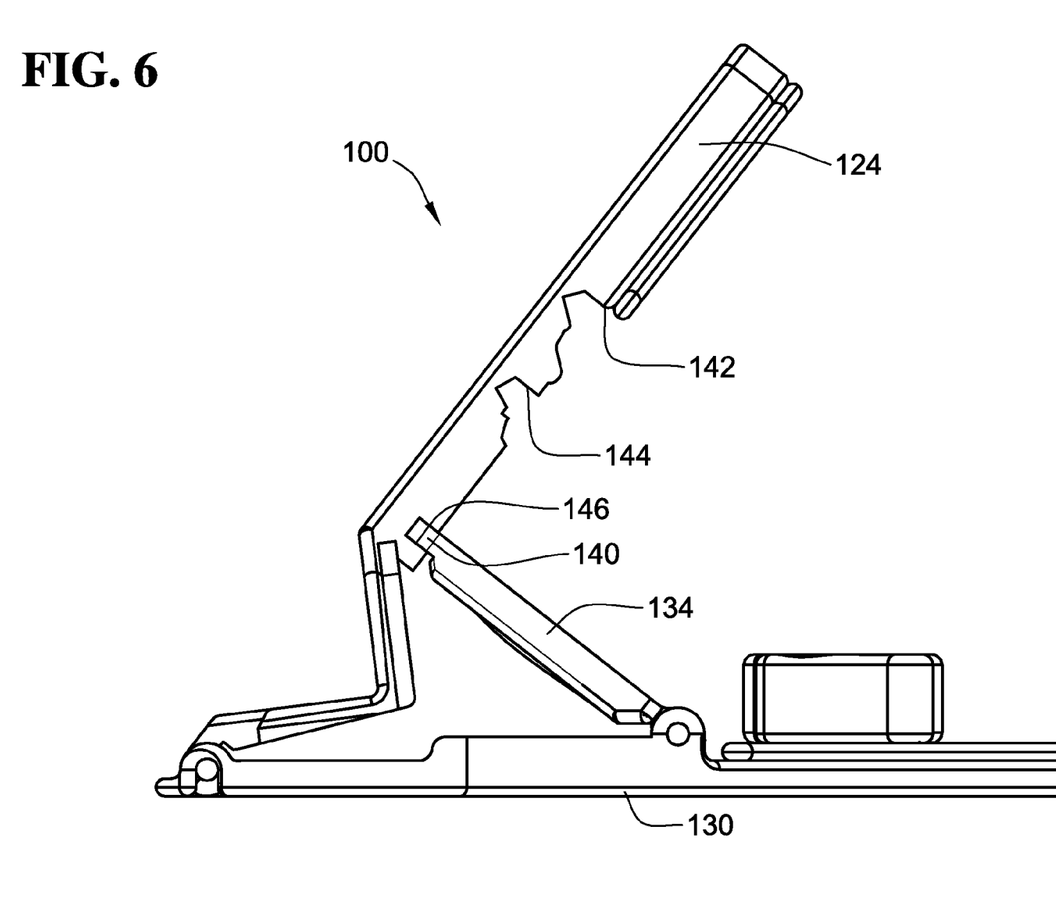
FIGS. 6 and 7 are end views of the apparatus of FIG. 1 configured for positioning work pieces having differing tilt angles.
Figure 7:
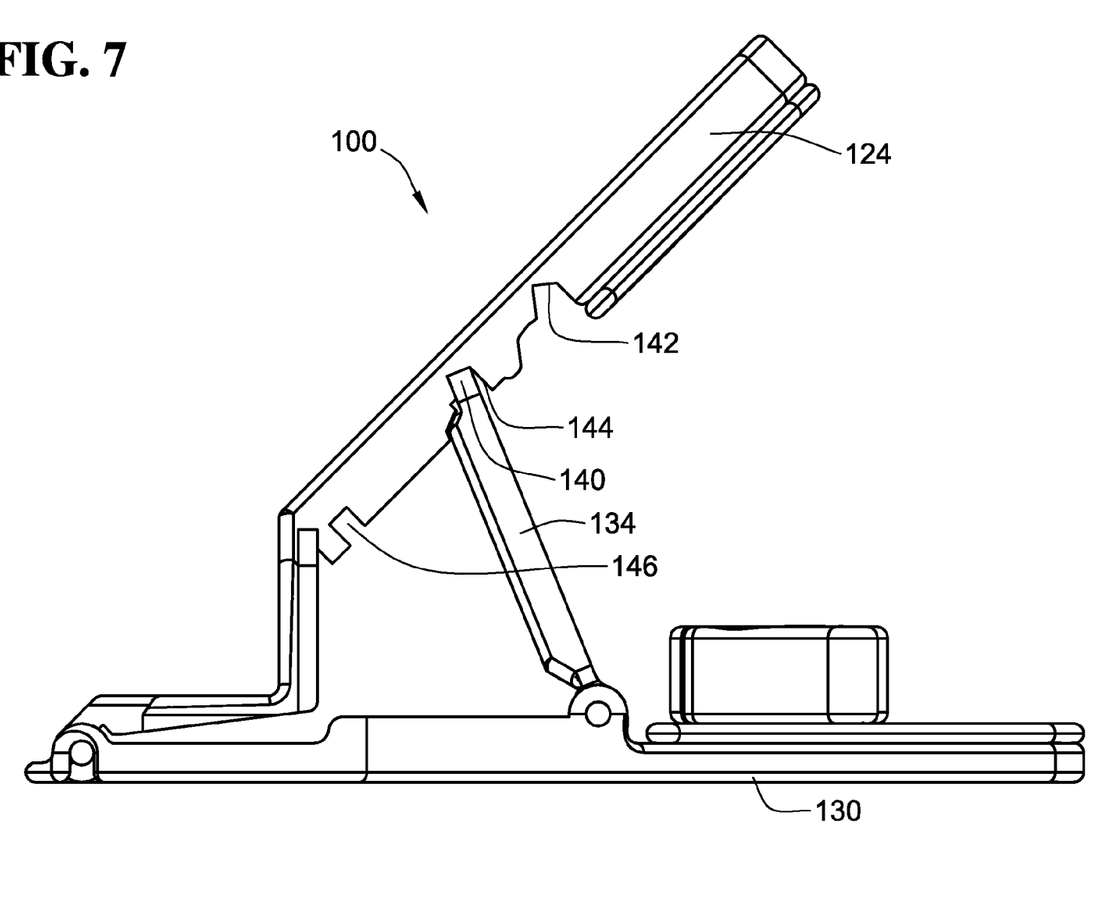

Specifically, the releasable retaining arrangement 132, in the first exemplary embodiment of the positioning apparatus 100, includes a brace member 134 having a first end thereof pivotably attached to the base 130 by a second hinge pin 136 for pivoting motion of the brace member 134 about a second pivot axis 138. The distal end 140 of the brace member 134 is configured to engage and be retained within one of three recesses 142, 144, 146 in the work piece support plate 124, in the manner illustrated in FIGS. 2, 6 and 7, so that a work piece support surface 148 of the work piece support plate 124 may be properly positioned for holding the work piece 102 at one of the three predetermined potential desired tilt angles 134, when the work piece 102 is being cut by the saw 108.

The first, second and third recesses 142, 144, 146 and the brace member 134 are cooperatively configured for positioning the work piece support surface 148 to provide tilt angles 134 of 52 degrees, 45 degrees, and 38 degrees, respectively, between the work piece 102 and the vertical reference plane 116. These angles represent those commonly used with crown moldings, but it will be understood that in other embodiments of the invention other angles could also be utilized. It will further be understood, that in other embodiments of the invention, a releasable retaining arrangement, according to the invention, could take other forms which would allow for adjusting and locking the work piece support surface 124 at an infinite number of angular positions. It will further be understood that, in other embodiments of the invention, a pivotable brace member, of the type described above, could have a first end thereof pivotably attached to the work piece support plate 124 and a distal end thereof engaging recesses in the baseplate 130.

As best seen in FIGS. 4 and 5, the first exemplary embodiment of the positioning apparatus 100 also includes a pair of gage members 150, 152 for determining the appropriate tilt angle 133 for a given work piece 102. As illustrated in FIG. 4, the crown molding 102 has bottom and rear reference surface thereof 154, 156 that are configured to extend perpendicularly from and rest against the mounting surface 120 of the wall 110 when the crown molding 102 is properly installed. Such an arrangement of bottom and rear mounting surfaces is typical for crown molding, and the gage blocks 150, 152 may be utilized as an aid in determining the proper tilt angle 133 for installing a given piece of crown molding 102.

For example, as illustrated by dashed lines in FIG. 4, the second gage member 152 is configured substantially as a triangle having corners of 90 degrees, 38 degrees and 52 degrees, respectively. For the crown mold 102 illustrated in FIG. 4, the second gage member 152 indicates that the crown mold 102 was designed to have its bottom and rear reference surface 154, 156 thereof perpendicular to, and resting flat against, the surface 120 of the wall 110 when the crown mold 102 is installed at a tilt angle 133 of 52 degrees.

The first gage member 150 is also substantially triangularly shaped, and has corners of 90 degrees, 45 degrees and 45 degrees, respectively. Those having skill in the art will appreciate that through use of one or the other of the first and second gage members 150, 152, the tilt angle 133 at which a particular work piece 102 of crown molding should be installed can be determined in the same manner as described above with regard to FIG. 4.

It will further be appreciated, with reference to FIG. 4, that the first exemplary embodiment of the work piece 102 of crown molding includes a protrusion 158, in the form of a dentil, which extends substantially beyond the remainder of the front surface 160 of the work piece 102. As shown in FIG. 2, the work piece support surface 148 of the work piece support plate 124 is configured to include a longitudinally extending groove 162 therein, for receiving the protrusion 158 in a non-supporting manner front face 160 of the work piece 102 is otherwise engaging the support surface 148 of the support plate 124 in a supporting manner.

The first and second gage members 150, 152, in the first exemplary embodiment of the apparatus 100 are removeably attachable to the base 130 by quick-turn fasteners, of the type disclosed in commonly assigned U.S. Pat. No. 7,089,978, titled "Tool Attachment System And Router Attachment And Method Incorporating Same," by Karkosch et al., the disclosures and teaches of which are incorporated herein by reference in their entireties.

By virtue of the construction described above, once the appropriate tilt angle 133 is established for a given work piece 102 of crown molding, the distal end 140 of the brace member 134 of the positioning apparatus 100 is inserted into the appropriate recess 142, 144, 146 in the work piece support plate 124, while the base 130 of the positioning apparatus 100 is resting on the table 104 of the mitre saw 108. The work piece 102 is then held with its front face 160 at least partially contacting the work piece support surface 148, in the manner illustrated in FIG. 2, with the bottom and rear reference surfaces 154, 156 of the work piece in contact with the table 104, and fence 106 of the saw 108.

It will be appreciated that with the work piece 102 held in this manner by the positioning apparatus 100 in abutment with the table and fence 104, 106 of the saw, the work piece 102 is properly positioned at the same tilt angle 133 as the work piece will be mounted as shown in FIG. 4.

With the work piece thus held in position, it can then be cut along a cutting plane 164 which passes through both the horizontal and vertical reference planes, in the manner illustrated in FIG. 3, to define a cutting line of intersection 166 with the horizontal reference plane 114, with the cutting plane 164 being disposed at a desired cutting angle 168 from the vertical reference plane 116. Typically, the cutting angle 168 in a crown molding installation along the intersection of a wall and a ceiling, or at the top of a piece of furniture or cabinetry, for example, will be set at one-half of the angle of intersecting vertical reference planes such as might be encountered at the corner of a room. Specifically, for a typical corner of 90 degrees, the cutting angle 168 would be set at 45 degrees.

It will be appreciated, therefore, that the invention provides an apparatus and method for positioning a work piece with respect to substantially horizontal and vertical reference planes intersecting one another along a longitudinal line of intersection at a right angle to one another, so that the work piece can be cut along a cutting plane passing through both the horizontal and vertical reference planes and defining a cutting line of intersection with the horizontal plane disposed at a desired cutting angle from the longitudinal line of intersection of the reference planes, while the apparatus holds the work piece in a tilted position at a desired tilt angle with respect to the vertical reference plane. Simply stated, the invention allows a work piece, such as a piece of crown molding or the like, to be conveniently positioned for cutting in substantially the same position as it will be mounted.

As shown in FIGS. 1 and 5, the work piece support plate 124, in the first exemplary embodiment of the apparatus 100, includes a support plate stiffener 170, and, in similar fashion, the base 130 includes a base stiffener 172. It will be appreciated that, in other embodiments of the invention, the support plate 124 and/or the base 130 may be constructed in a variety of other configurations, in accordance with the invention, which do not include the use of such stiffeners 170, 172. For example, as described in detail below and illustrated in FIGS. 10-14, the support plate 224 of the second exemplary embodiment of a positioning apparatus 200, according to the invention, does not include a support plate stiffener.

Figure 8:
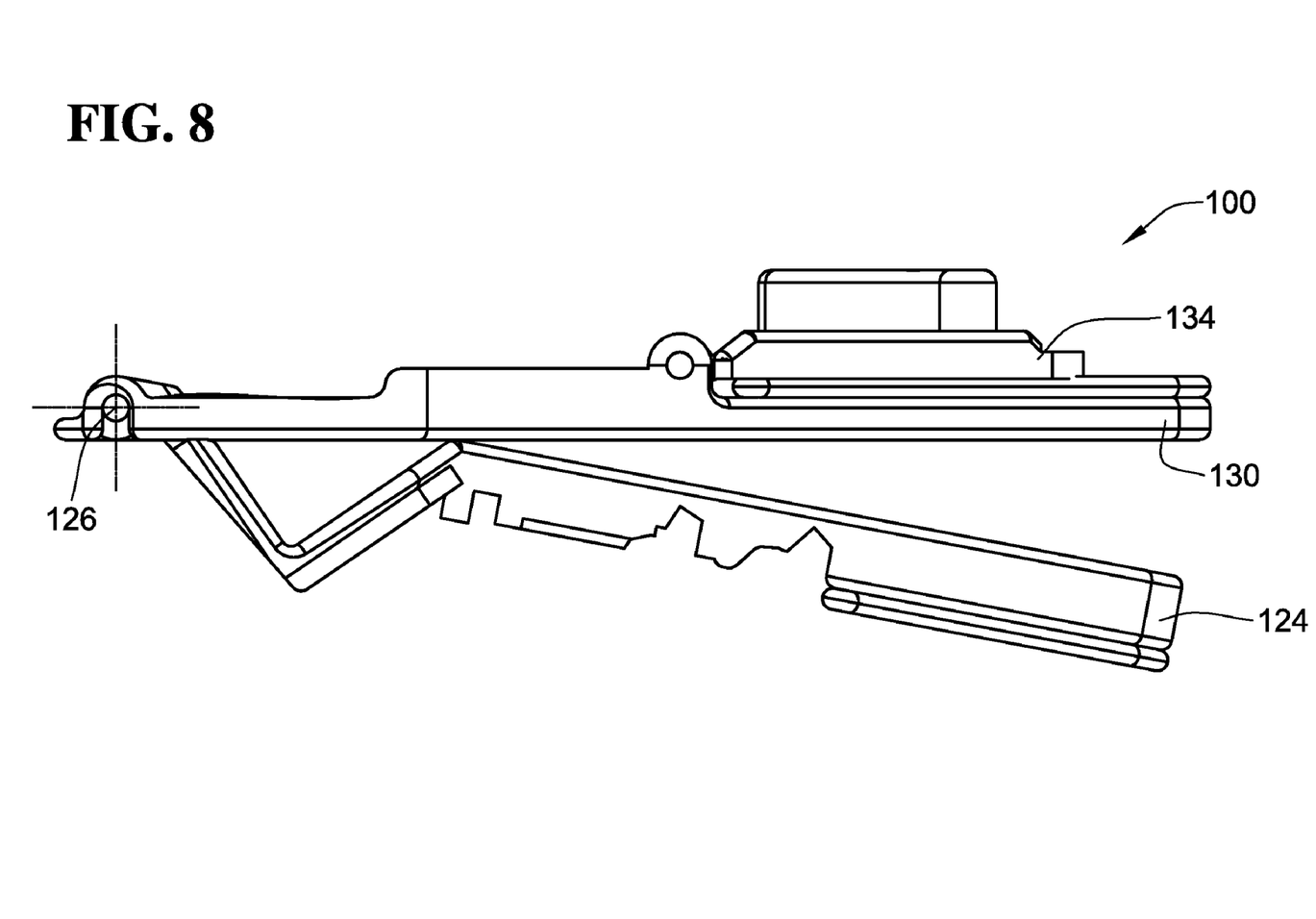
FIGS. 8 and 9 are an end view and a perspective illustration, respectively, of the first exemplary embodiment of the positioning apparatus of FIG. 1, with the positioning apparatus folded into a compact position for stowage.
Figure 9:
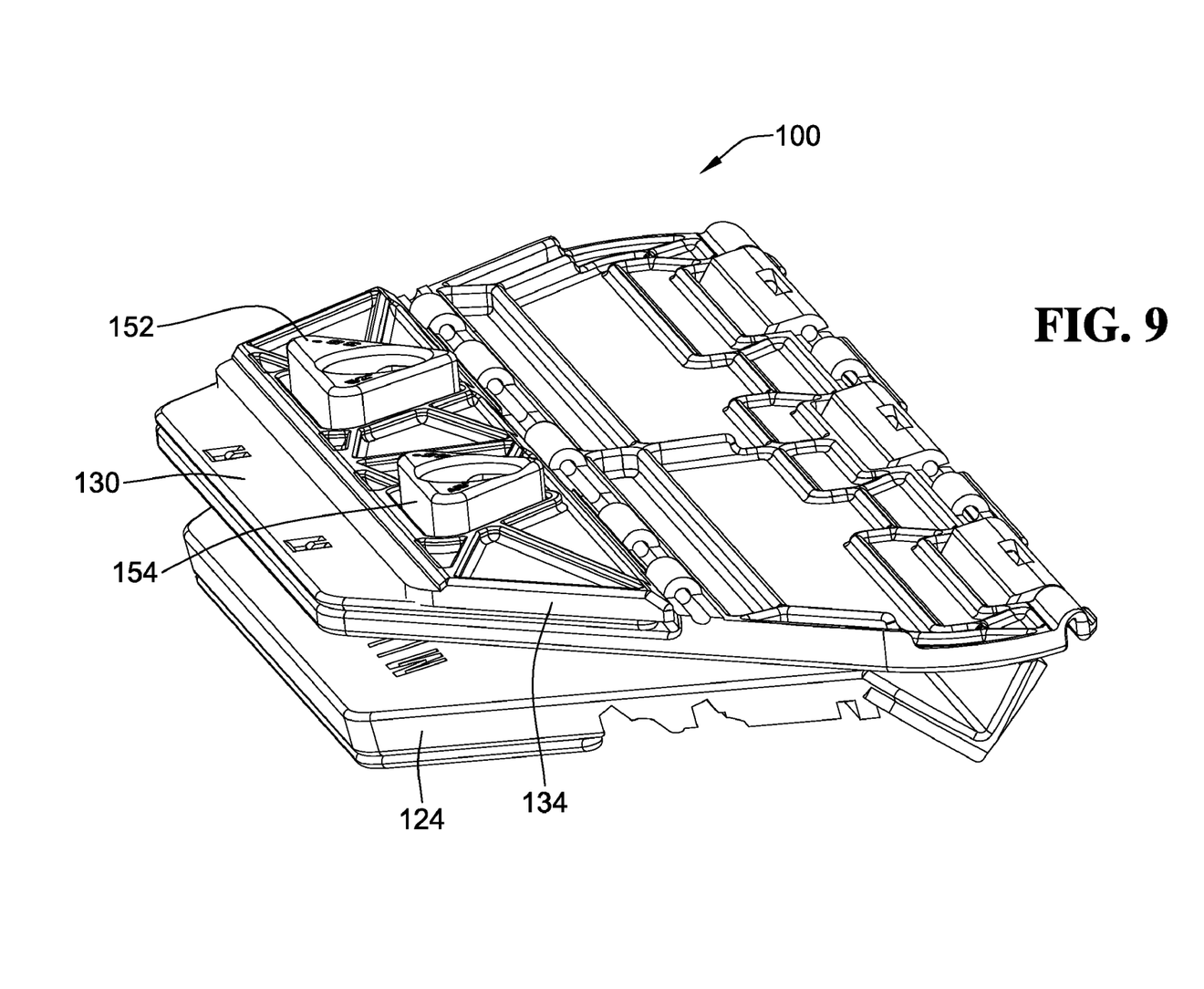

As shown in FIGS. 8 and 9, in the first exemplary embodiment of the positioning apparatus 100, the brace member 134 is configured to fold flat against the base 130 and the work piece support plate 124 is configured to be pivotable about the pivot axis 126 from any of the desired tilt angles 134 to an angular position adjacent the base 130, for compact stowage of the positioning apparatus 100. As will be understood from an examination of FIG. 5, the brace member 136 of the first exemplary embodiment 100 includes a pair of triangular shaped openings 174, 176 therein which provide clearance around the first and second gage members 150, 152, when the gage members 150, 152 are attached to the base 130, so that the brace member 136 can pivot past the gage members 150, 152 into a folded flat position against the base 130 for stowage.

Figure 10:
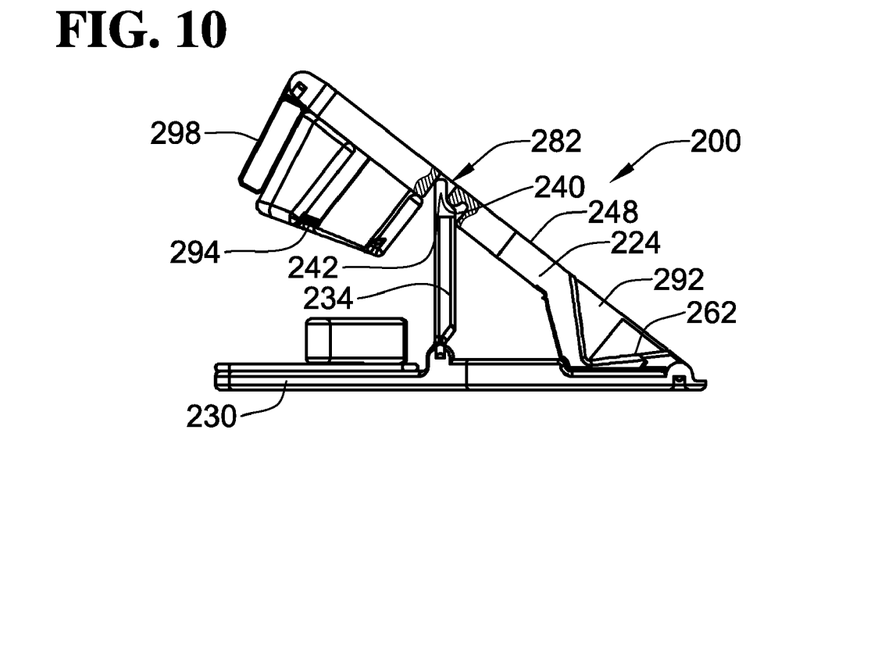
FIGS. 10 and 11 are a side view and a front view, respectively, of a second exemplary embodiment of a positioning apparatus, according to the invention, which includes an insert in a longitudinally extending groove in the support plate of the apparatus, a detachable tray for storage of the insert when not in use, and a plurality of openings extending through the support plate so that a distal end of a brace member may be viewed through a support surface of the support plate to thereby facilitate angular positioning of the support plate.
Figure 11:
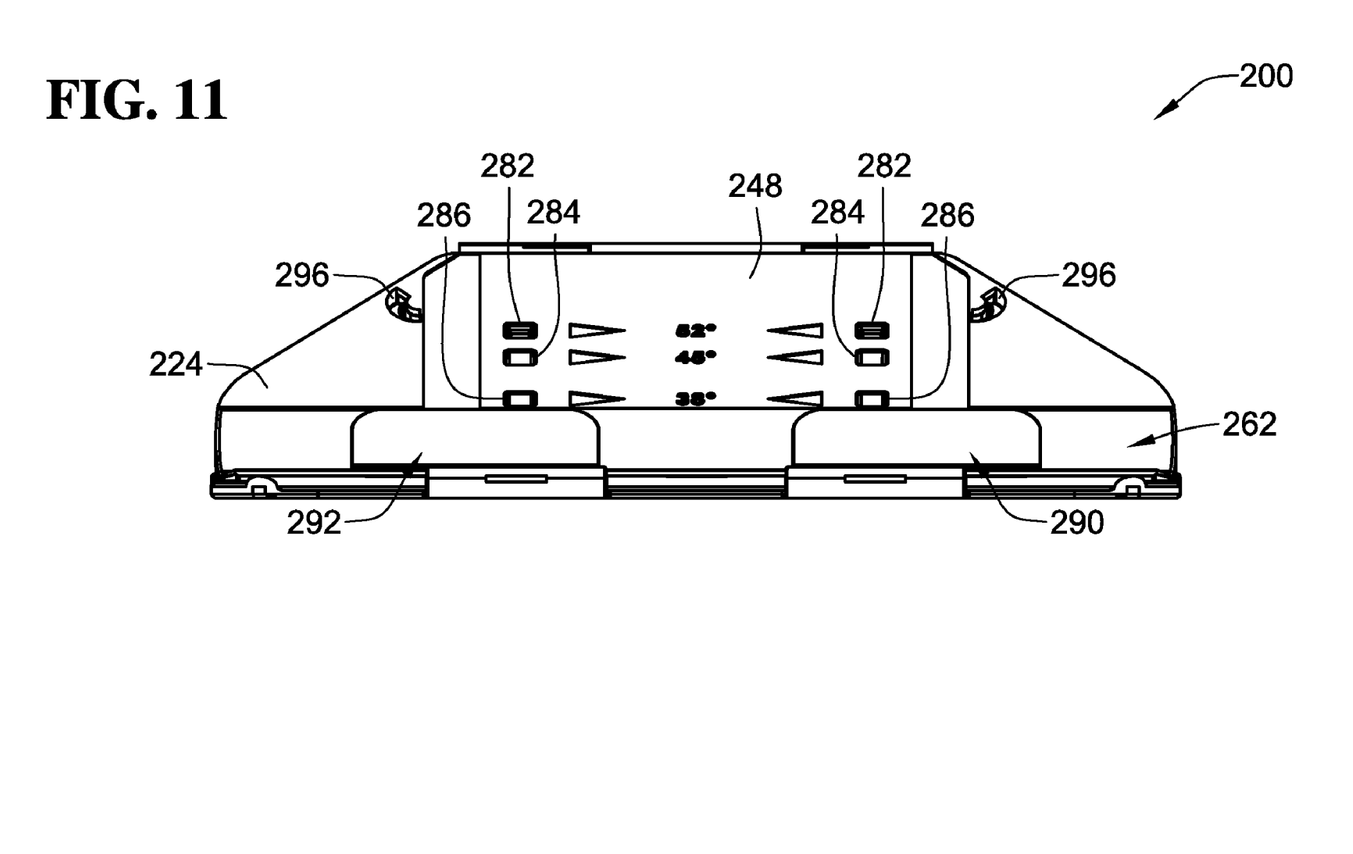
Figure 12:
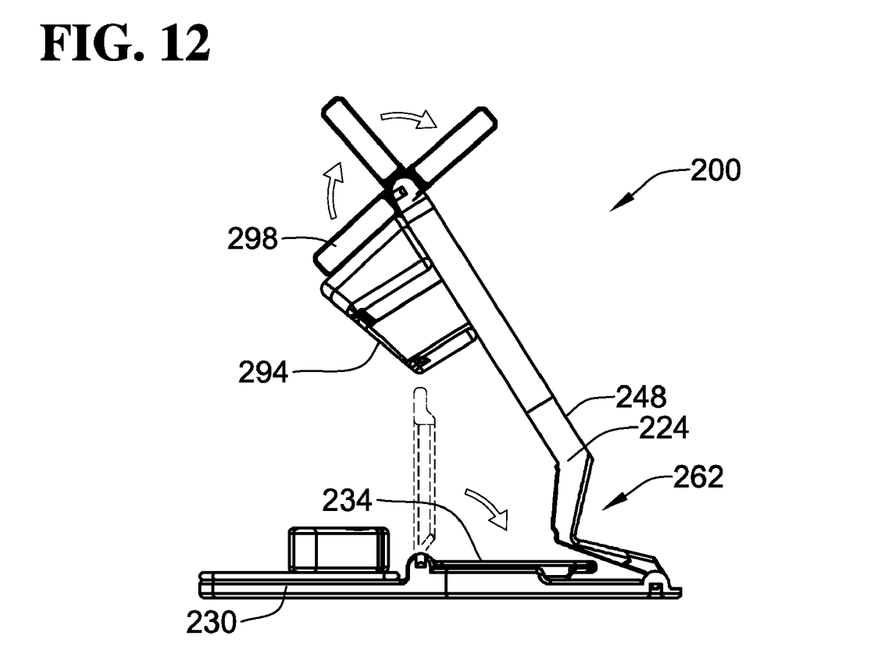
FIGS. 12-14 are side views sequentially illustrating the manner in which the second exemplary embodiment of the positioning apparatus shown in FIG. 10 may be reconfigured from an operating to a stowage position.

FIGS. 10 and 11 illustrate a second exemplary embodiment of a positioning apparatus 200, according to the invention, which is substantially similar in construction and operation to the first exemplary embodiment of the positioning apparatus 100 described above, but having several additional features. To facilitate explanation and understanding of the second exemplary embodiment of the positioning apparatus 200, the components and features thereof will generally bear reference numerals which are incremented by 100 over the reference numerals for similar components and features described above in relation to FIGS. 1-9.

The second exemplary embodiment of the positioning apparatus 200 includes a work piece support plate 224, a base 230 and a brace member 234 which are generally configured and interconnected for pivoting movement with respect to one another in the same manner as the corresponding parts 124, 130, 134 of the first exemplary embodiment of the positioning apparatus 100 described above. The brace member 234 is pivotably attached at a lower end thereof to the base 230 and includes a distal end 240 thereof which engages with a series of three recesses in the backside of the support plate 224, for positioning the support plate 224 at one of three desired angles, i.e. 38, 45 or 52 degrees, with only one recess 242 of the three recesses in the backside of the support plate 224 being shown in cross-section in FIG. 10.

As best seen in FIG. 11, with reference to FIG. 10, in the second exemplary embodiment of the positioning apparatus 200, the support plate 224 includes three pairs of openings 282, 284, 286, which extend through the support plate 224 from the support surface 248 of the support plate 224. Each opening of each of the three pairs of openings 282, 284, 286 intersects with a corresponding one of the three recesses in the back side of the support plate 224, in the manner illustrated in the cut-away section of FIG. 10 with respect to the openings 282 and the distal end 140 of the brace member 234 with the brace member 234 engaging the recess 282, so that the position of the distal end 240 of the brace member 234 may be viewed looking through the openings 282, 284, 286, from the support surface 248 of the support plate 224, in the manner illustrated for the openings 282 in FIG. 11. The openings 282, 284, 286, therefore, facilitate operation of the positioning apparatus 200 by providing a convenient way to determine that the brace member 234 is indeed positioned at a desired angle, of 52 degrees, for example, as shown in FIG. 11.

As shown in FIGS. 10 and 11, the support surface 248 of the support plate 224 of the second exemplary embodiment of the work piece positioning apparatus 200 includes a longitudinally extending groove 262 therein, for receipt of dentils or other protrusions 158 (see FIG. 4) of the work piece 102 which may extend beyond the remainder of the front surface 160 of the work piece 102. The second exemplary embodiment of the work piece positioning apparatus 200 further includes a pair of inserts 290, 292 which are adapted to fit into and be retained within the longitudinally extending groove 262, to bridge the longitudinally extending groove 262, for use with work pieces that do not include protrusions extending beyond the front surface of the work piece, or for adapting the positioning apparatus 200 for use with work pieces which may have a width too small to bridge the longitudinally extending groove 262 to a point of support along the support face 248 above the longitudinally extending groove 262.

Figure 14:
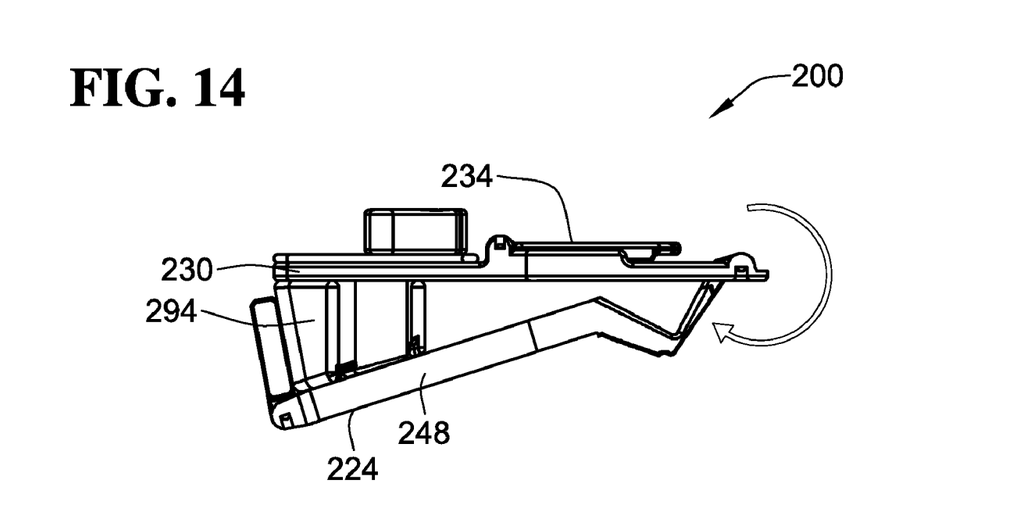

An insert storage tray 294 is provided for stowage of the inserts 290, 292 when they are not being used, or when the second exemplary embodiment of the positioning apparatus 200 is folded into a stowage position as shown in FIG. 14.

Figure 13:
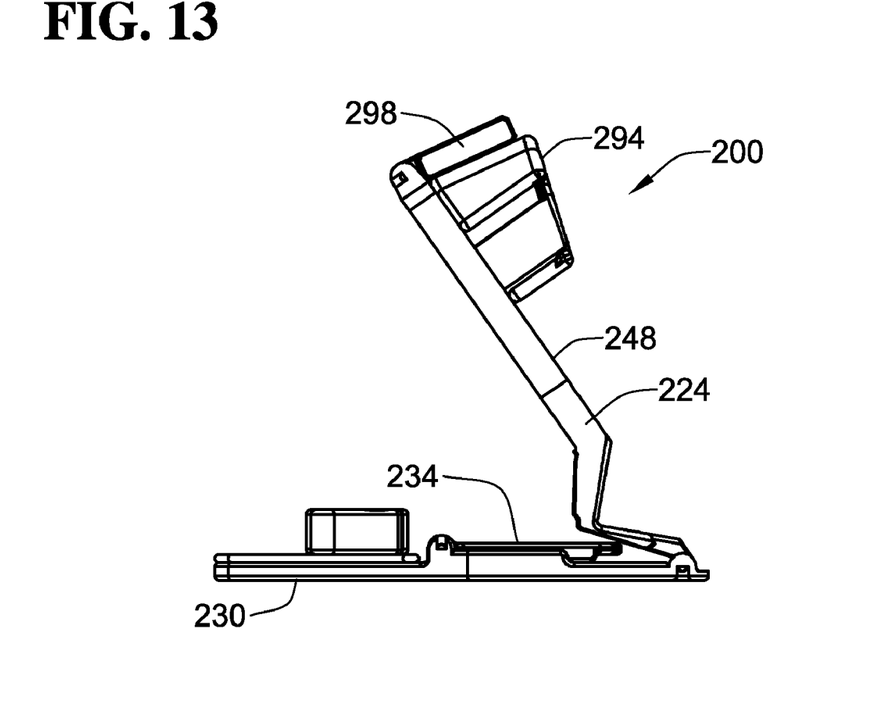

The insert storage tray 294 is configured to be alternatively attachable to the backside of the support plate 224, in the manner illustrated in FIG. 10, by any appropriate means such as snap interconnections, fasteners, clips or turn-lock retainers. As shown in FIGS. 13 and 14, the storage tray 294, of the second exemplary embodiment 200, is further adapted to be alternatively attached to the support surface 248 of the support plate 224, for stowage within of the inserts 290, 292 when the positioning apparatus 200 is folded for storage, as shown in FIG. 14.

The exemplary embodiment of the storage tray 294 includes a pair of snap connections 296 at opposite ends of the storage tray 294, which are visible in FIG. 11, for connection of the storage tray 294 to the work piece support plate 224. In addition, a pivoting storage tray connector 298 is pivotably attached to the distal end of the work piece support plate 224, and the storage tray 294 and the storage tray retainer 298 include a turn-lock fastener (not shown) which additionally serves to secure the storage tray 294 to the support plate 224 in either an operating position of the positioning apparatus 200, as shown in FIG. 10, or in a stowed position of the apparatus 200, as shown in FIG. 14. The combination of the snap connections 296 and the turn-lock retention feature between the storage tray 294 and the storage tray retainer 298 serve to securely lock the storage tray 294 to the support plate 224 in such a manner that when the storage tray 294 is locked into the operating position, as shown in FIG. 10, the storage tray 294 serves to enlarge the gripping area provided by the positioning apparatus 200.

FIGS. 10 and 12-14 sequentially illustrate the manner in which the inserts 290, 292 may be placed inside of the storage tray 294, and the storage tray 294 moved from the backside to the working surface 248 of the support plate, so that the brace member 234 and support plate 224 may be rotated clockwise (as shown in FIGS. 10 and 12-14) from an operating position to a stowed position of the apparatus 200.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for positioning a workpiece at a stationary fixed location with respect to substantially horizontal and vertical reference planes intersecting one another along a longitudinal line of intersection at a right angle to one another, where the workpiece has bottom and rear reference surfaces thereof and a front face thereof all extending along a longitudinal axis of the workpiece, so that the workpiece can be cut by a cutting blade moving with respect to the stationary workpiece and the apparatus along a cutting plane passing through both the horizontal and vertical reference planes and defining a cutting line of intersection with the horizontal plane disposed at a desired cutting angle from the longitudinal line of intersection of the reference planes while the apparatus holds the workpiece in a tilted position at a desired tilt angle with respect to the vertical plane in an orientation with respect to the horizontal and vertical reference planes and the cutting plane matching an installed orientation of the workpiece, the apparatus comprising:

a workpiece support plate pivotably attached along a pivot axis to a base adapted to rest on the horizontal reference plane, for pivoting motion of the support plate about the pivot axis to the desired tilt angle with respect to the vertical reference plane with the pivot axis extending parallel to the longitudinal line of intersection; and a releasable retaining arrangement operatively connectable between the workpiece support plate and the base for holding the workpiece support plate at the desired tilt angle from the vertical reference plane;

the workpiece support plate having a workpiece support surface thereof adapted for engaging at least a portion of the front face of the workpiece while the bottom and rear reference surfaces of the workpiece are aligned with the horizontal and vertical reference planes respectively in such a manner that apparatus is stationary at the fixed location with the workpiece supported by the apparatus in the installed orientation of the workpiece at the desired tilt angle from the vertical reference plane with the longitudinal axis of the workpiece extending substantially parallel to the longitudinal line of intersection of the horizontal and vertical reference planes in such a manner that the workpiece and apparatus remain stationary with respect to the horizontal and vertical reference planes and the cutting plane at the fixed location such that the workpiece is oriented for cutting along the cutting plane by passage of the cutting blade through the workpiece along the cutting plane;

wherein the releasable retaining arrangement comprises a brace member adapted for operative attachment between the base and the support plate and configured for holding the workpiece support plate at two or more different potential desired tilt angles;

the brace member is pivotably attached to the base and has a distal portion thereof adapted for engagement with the support plate; and the support plate further comprises two or more recesses therein opposite the support surface for receiving and retaining the distal portion of the brace member when the brace member is pivoted with respect to the base to a corresponding position for holding the workpiece support plate at one or the other of two or more different potential desired tilt angles;

wherein, the support plate further comprises openings extending therethrough from the support surface to each of the recesses, such that the distal end of the brace member is visible from the support surface of the support plate through the opening extending from the one of the two or more recesses in which the distal end of the brace member is received.

2. The apparatus of claim 1, wherein, the workpiece support plate is pivotable about the pivot axis from the desired tilt angle to an angular position adjacent the base, for compact stowage of the apparatus.

3. The apparatus of claim 1, wherein:

the workpiece is configured for mounting at a predetermined tilt angle from a tilt angle reference plane; and the apparatus further comprises, a gage member configured for determining the predetermined tilt angle of the workpiece.

4. The apparatus of claim 3, wherein, the gage member is attachable to the base for stowage.

5. The apparatus of claim 1, wherein, the front face of the workpiece has a protrusion extending therefrom, and the support surface of the support plate is configured for receiving the protrusion in a non-supporting manner while the front face of the workpiece is engaging the support surface in a supporting manner at the at least a portion of the front face.

6. The apparatus of claim 1, wherein:
the support surface of the support plate includes a longitudinally extending groove therein for receiving a protrusion of the workpiece in a non-supporting manner while the front face of the workpiece is engaging the support surface in a supporting manner at the at least a portion of the front face; and
the apparatus further includes at least one insert adapted to be retained in the longitudinally extending groove and having an insert support surface for at least partially extending the support surface of the support plate across the longitudinally extending groove.

7. The apparatus of claim 6, further comprising, a storage tray adapted for removable attachment to the support plate for storage of the at least one insert within the storage tray.

8. The apparatus of claim 7, wherein, the storage tray is attachable to the support plate in either an operating or a stowage position of the support plate with respect to the base.

9. The apparatus of claim 8, wherein, the storage tray is configured to provide an enlarged gripping surface when attached to the support plate while the support plate is in the operating position.

10. A method for positioning a workpiece in a stationary fixed location in an orientation matching an installed orientation of the workpiece with respect to substantially horizontal and vertical reference planes intersecting one another along a longitudinal line of intersection at a right angle to one another, where the workpiece has bottom and rear reference surfaces thereof and a front face thereof all extending along a longitudinal axis of the workpiece, so that the workpiece can be cut by a cutting blade moving with respect to the stationary workpiece and the apparatus along a cutting plane passing through both the horizontal and vertical reference planes and defining a cutting line of intersection with the horizontal plane disposed at a desired cutting angle from the longitudinal line of intersection of the reference planes while the apparatus holds the workpiece in a tilted position at a desired tilt angle with respect to the vertical plane, the method comprising, positioning the workpiece, in the stationary fixed location in the orientation matching the installed orientation of the workpiece, with an apparatus disposed at a stationary fixed location of the apparatus with respect to the horizontal and vertical reference planes and the cutting plane, wherein the apparatus comprises:

a workpiece support plate pivotably attached along a pivot axis to a base adapted to rest on the horizontal reference plane, for pivoting motion of the support plate about the pivot axis to the desired tilt angle with respect to the vertical reference plane with the pivot axis extending parallel to the longitudinal line of intersection; and a releasable retaining arrangement operatively connectable between the workpiece support plate and the base for holding the workpiece support plate at the desired tilt angle from the vertical reference plane;

the workpiece support plate having a workpiece support surface thereof adapted for engaging at least a portion of the front face of the workpiece while the bottom and rear reference surfaces of the workpiece are aligned with the horizontal and vertical reference planes respectively in such a manner that the workpiece is supported by the apparatus at the desired tilt angle from the vertical reference plane with the longitudinal axis of the workpiece extending substantially parallel to the longitudinal line of intersection of the horizontal and vertical reference planes;

the releasable retaining arrangement having a brace member adapted for operative attachment between the base and the support plate and configured for holding the workpiece support plate at two or more different potential desired tilt angles;

the brace member being pivotably attached to the base and having a distal portion thereof adapted for engagement with the support plate;

the support plate also including two or more recesses therein opposite the support surface for receiving and retaining the distal portion of the brace member when the brace member is pivoted with respect to the base to a corresponding position for holding the workpiece support plate at one or the other of two or more different potential desired tilt angles;

wherein, the support plate further comprises openings extending therethrough from the support surface to each of the recesses, such that the distal end of the brace member is visible from the support surface of the support plate through the opening extending from the one of the two or more recesses in which the distal end of the brace member is received.

\* \* \* \* \*